Patented Jan. 24, 1933

1,895,433

UNITED STATES PATENT OFFICE

LAWRENCE BRADSHAW, OF BAINBRIDGE, NEW YORK

METHOD OF IMPROVING THE WATER-RESISTANCE OF CASEIN GLUES

No Drawing. Application filed June 21, 1929. Serial No. 372,801.

This invention relates to a method of treating casein glues used for the gluing together of plywood, wood-joints, wood fibre-board and the like, and is particularly directed to improvements in the water-resisting properties of the said glues and the ultimate shearing strength of the joints after prolonged exposure to water.

In general, casein glues consist in their simplest form of milk-casein (with or without the admixture of vegetable protein or products rich in vegetable protein) and hydrated lime, together with one or more salts of an alkaline character capable of dissolving the protein when water is added. They may also contain thinning agents such as sodium fluoride, and various other ingredients for special purposes.

The term "casein glue" is hereinafter used in this broad sense.

The main function of the lime in these glues is to impart water-resistance. Milk-casein glues containing from 18 to 30% of lime are commonly termed "waterproof". In practice, however, absolute waterproofness is seldom if ever attained, even by the use of a large excess of lime and attempts have therefore been made to raise the degree of water-resistance by the addition of other reagents. Moreover, the presence of the comparatively large proportion of lime required to impart a reasonably high degree of water-resistance may be objectionable in other ways, e. g. (1) the working life of the glue is greatly shortened thereby and (2) the set glue after drying has a highly abrasive action on the cutting appliances used in wood-working, i. e. it dulls the saws, knives, etc.

The principal object of the present invention is to produce milk-casein glues of superior water-resistance and wet-shear strength without the use of excessive amounts of lime, such as shall exceed the revised specifications of the U. S. Army (No. 82-6-A) for aircraft plywood.

Another object is to improve the water-resistance of the cheaper grades of proteinaceous glues (i. e. those containing a lower percentage of milk-casein together with filling substances, or glues containing vegetable substances rich in protein, or mixtures of milk casein with vegetable substances rich in protein) so that these suffice for the more moderate requirements of the wood-working industries in general, although the water-resistance falls below the high standard of aircraft plywood.

In carrying out the invention I add to the glue (as herein defined) an aldehyde either alone or in the presence of a "retarding agent" the function of which is to retard the setting (or in other words, to prolong the working life) of the glue.

As examples of the aldehydes which I have found to give the desired effect in different degree, the following may be mentioned: acetaldehyde, aldol, paraldol, butyraldehyde, crotonaldehyde; citral and the natural essential oils containing it, e. g. the oils of lemon, lemongrass and verbena; citronellal (and citronella oil); also the aromatic aldehydes; benzaldehyde (and oil of almonds) anisaldehyde, cinnamic aldehyde (and oil of cinnamon), and their nitro and chlor derivatives, e. g. m-nitrobenzaldehyde and o-chlorobenzaldehyde.

The aforementioned aldehydes and aldehyde compounds are effective in widely different degree as described more particularly below. When comparatively small amounts of these compounds are added to a casein glue they produce a more or less rapid thickening and coagulation of the glue. Thus, the addition of croton aldehyde produces an almost instantaneous coagulation, while acetaldehyde acts very slowly. Aldol and paraldol, while much slower in their action than crotonaldehyde, cause fairly rapid coagulation. In general I have found that those aldehydes which produce the most rapid coagulation are likewise the most efficient waterproofing agents. As an illustration of the divergent speeds of the various aldehydes in producing coagulation, a few of them are compared in the table below. In each case the values relate to the life of the glue to which a given percentage of the aldehyde, based on the weight of the glue powder employed, has been added. The casein glue powder, containing 12% of lime together with sufficient trisodium phosphate to act as a casein solvent, and sufficient sodium fluoride to act as a thinning agent, was dissolved in the proportion of 100 parts of powder to 200 parts of water at 60° F. After stirring the glue for 20 minutes, the aldehydes were added respectively in the proportion of 0.5, 1.0 or 2.0 parts as indicated. In certain cases the aldehyde was first mixed with an equal weight of water. The stirring was continued for 5 minutes, and the physical condition of the glue observed thereafter at intervals to the point at which it set. As it is difficult to determine the "setting" point with accuracy, the values are to be regarded as approximate only. The normal life of the casein glue without the addition of aldehyde is about 10 hours.

*Working life of glue: Hours*

|  | Amount of aldehyde added | | | |
|---|---|---|---|---|
|  | 0. | 0.5% | 1.0% | 2.0% |
| Normal glue | 10 hrs. |  |  |  |
| Croton aldehyde |  | Coagulates. |  |  |
| Acetaldehyde |  | 10 hrs. | 7 hrs. | 6 hrs. |
| Aldol |  | 2 | 1 | ½ |
| Aldol 50% aqueous soln |  | 3 | 1¼ | ½ |
| Paraldol 50% aqueous soln |  | 3 | 1¼ | ½ |
| Butyraldehyde |  | 8 | 6 | 3 |
| Benzaldehyde |  | 9 | 4 | 1 |
| Citral |  | 6 | 3 | 2 |

The percentages given in the above table refer to the percentages of actual aldehyde, which is added without dilution except where otherwise stated.

These varying speeds in the rate of coagulation can be utilized in controlling the life of a glue of any given formula, i. e. where a short life is desired those compounds which produce rapid coagulation may be used, while the less active compounds are selected for the glues required to have a longer working life. Intermediate properties are obtained by using a mixture of two or more aldehydes e. g. aldol may be mixed with acetaldehyde in various proportions. In this connection it may be noted that many of the commercial aldehydes themselves are not chemically pure. Thus, technical aldol contains approximately 2% of acetaldehyde and water; a high grade of commercial paraldol is only about 95% pure, while a lower grade contains as much as 50% of aldol. The essential oils referred to above, likewise usually contain more than a single aldehyde.

I have also found that the speed of coagulation can be retarded by the addition, besides the aldehyde, of certain metallic salts and organic compounds. Examples of the salts thus employed are the chloride, sulphate and nitrate of copper. Of these, the nitrate is the most effective retarder. Likewise the nitrates of nickel, calcium, and strontium act as retarders. Commercial calcium chlorate also has been found to possess marked retarding properties. These salts are preferably added in the form of a saturated solution to the aldehyde, just before mixing into the glue, or the salt solution may be added to the glue just before the aldehyde is added.

As examples of organic compounds which I have found to be effective in prolonging the life of the glue may be mentioned the sulfonic acids of benzene, naphthalene and their derivatives such as sulfanilic acid, aminonaphthol sulfonic acid (gamma acid), $\beta$-naphthylamine $\beta$-sulfonic acid (Broenner acid) and their alkali-metal salts. These likewise are preferably used in solution and may be mixed with the aldehydes or added to the dissolved glue prior to the addition of the aldehydes.

The amount of retarding compound used is comparatively small, varying from about 1 to 2% for the inorganic salts and 2% to 5% for the organic compounds employed. Larger amounts of the inorganic salts, while appreciably extending the life of the glue do not add to the water-resistance. In Example 1, for instance, it has been found by experiment than an increase in the amount of copper nitrate from 1% to 3%, actually diminishes the ultimate water-resistance of the glue line.

In illustration of the effects obtained by the application of this process I give below a comparison of the shear strength of plywood panels glued up with casein glues, and with the same glues to which the aldehydes, etc. have been added.

These tests were made in accordance with U. S. Army specifications No. 82-6-A, on standard three-ply $\frac{1}{16}$ inch veneer with birch faces on poplar cores and also, by way of comparison, on birch cores. The wet-shear strengths relate to strips which have been soaked in water for 48 hours immediately before testing, as described in the specifications. Shear strengths are recorded in pounds per square inch.

In the tabulation, the values obtained with the untreated casein glues are indicated by the letter $a$; $b$ indicates the same glue mixed with an aldehyde, while $c$ and $d$ refer to the same mixed with an aldehyde and a retarder. Number Ic is the glue described in Example I (below), number IIc that described in Example II and IVc corresponds to Example IV.

| Ref. No. | | Birch/Poplar | | | | Birch/Birch | | | |
|---|---|---|---|---|---|---|---|---|---|
| | | Dry shear | Glue failure (per cent) | Wet shear | Glue failure (per cent) | Dry shear | Glue failure (per cent) | Wet shear | Glue failure (per cent) |
| I a | Glue | 435 | 85 | 90 | 100 | 415 | 75 | 90 | 100 |
| b | Glue +0.5% aldol | 400 | 35 | 185 | 95 | 420 | 60 | 190 | 95 |
| c | Glue +0.5% aldol +1% Cu salt | 470 | 55 | 205 | 100 | 420 | 80 | 190 | 100 |
| II a | Glue | 370 | 30 | 165 | 100 | 390 | 90 | 190 | 100 |
| b | Glue + 0.5% paraldol | 405 | 35 | 195 | 90 | 400 | 70 | 200 | 95 |
| c | Glue +0.5% paraldol +1% Cu salt | 425 | 65 | 185 | 90 | 435 | 70 | 205 | 95 |
| d | Glue +1.0% paraldol +2% Cu salt | 475 | 30 | 215 | 15 | 425 | 75 | 220 | 90 |
| IV a | Glue | --- | --- | --- | --- | 395 | 75 | 0 | 100 |
| c | Glue +0.5% aldol +1% Cu salt | --- | --- | --- | --- | 435 | 50 | 145 | 100 |

I am aware that formaldehyde has long been employed as an agent for rendering casein insoluble, notably in the paper-coating industry. In the coating of paper the conditions are different, inasmuch as the formaldehyde is used in the presence of a large excess of water i. e. in a very fluid medium, whereas the casein glues used in the wood-working industry are generally made up with 2 to 2½ or rarely 3 parts of water, at which dilution they have a rather thick and viscous consistency. When a small amount, say 0.5%, of a 40% aqueous solution of commercial formaldehyde is added to a casein glue having a suitable consistency for wood-working (such as that described above, or in the examples cited below) in place of one of the other aldehydes therein referred to, an immediate coagulation is produced. So powerful is this reagent that even a few drops of a 1% aqueous solution of formaldehyde suffice to bring about an almost instantaneous coagulation; even in the presence of one of the retarders above mentioned, coagulation proceeds so rapidly that the working life of the glue is too short for practical purposes. In this respect formaldehyde may be placed in a class apart, and as such it is specifically excluded from my claims. Likewise the compounds of formaldehyde such as those referred to in U. S. Patent No. 1,373,412 form no part of the present invention and are specifically disclaimed.

No claim is made herein to the use of formaldehyde, either in the unpolymerized state $(CH_2O)$ or in the polymerized state $(CH_2O)_n$, nor to its derivatives. The aldehydes which I employ all contain in their unpolymerized state a plurality of carbon atoms, while formaldehyde contains one carbon atom only.

No claim is made herein to dry glue base made up of casein, alkali metal salts, and lime, with or without seed meal, nor to the liquid glue made by mixing such a dry glue base with water.

For general purposes I prefer to use one of the polymers of acetaldehyde viz. aldol or paraldol. In order to make clear the manner in which the aldehydes are employed the following examples are given but it will be understood that I do not limit myself to the particular compounds or amounts herein set forth.

*Example I*

100 parts of a "low lime" casein glue containing about 12% of hydrated lime, with sufficient tri-sodium phosphate to act as a casein solvent, and sufficient sodium fluoride to act as a thinner, are slowly added to 200–215 parts of cold water in a vessel provided with an efficient stirrer. The stirring is continued for about 20 minutes until the glue has acquired a uniform consistency free from lumps. Without interrupting the stirring 1 part of a 50% aqueous solution of aldol mixed with 2 parts of a 50% solution of copper nitrate is added, and the mixing continued for about 5 minutes, when the glue is ready for spreading. The product in a particular case, had a viscosity corresponding to about 10–20 revolutions per minute on the Stormer viscosimeter using a 500 gr. weight (a consistency somewhat thinner than that of molasses). If desired, the copper salt may be omitted, in which case the glue will be somewhat thicker.

*Example II*

100 parts of a casein glue containing about 18% hydrated lime, with tri-sodium phosphate and sodium fluoride are dissolved in about 200–215 parts of cold water as described in Example I. After about 20–30 minutes, 2 parts of a 50% aqueous solution of paraldol mixed with 4 parts of a 50% solution of copper nitrate are added and the stirring continued for about 5 minutes, when the glue is ready for use. This glue has a viscosity corresponding to about 15 to 25 revolutions per minute on the Stormer viscosimeter as above.

*Example III*

100 parts of a glue having the approximate composition shown in Example II are dissolved in 200–215 parts of cold water as described. After about 20 minutes stirring a suspension of 3 parts of sulfanilic acid in 6 parts of water is added, followed by 1 part of 50% aqueous solution of aldol and ¼ part acetaldehyde, and the stirring is continued for about 5 minutes. The consistency of the glue is about the same as in Example II.

*Example IV*

100 parts of a glue having the approximate composition: milk-casein 39%, peanut meal 39%, hydrated lime 11%, tri-sodium phosphate 4%, sodium fluoride 7% are dissolved in 225–235 parts of cold water as in Example I. After about 20-30 minutes, a mixture of about ½ part aldol, 1 part water and 2 parts 50% solution of copper nitrate is added, and the glue stirred for about 5 minutes. It is then ready for use. The viscosity corresponds to about 20-30 revolutions per minute on the Stormer viscosimeter.

I have referred above to casein glues. My experiments have also shown that a fair degree of water-resistance can be imparted to seed-meal glues (i. e. vegetable seed meals rich in protein, such as peanut meal, cottonseed meal, and the like, with lime, alkalies, etc. without milk-casein) by addition thereto of the aldehydes above referred to, with or without retarders. With such seed-meal glues, I employ a rather larger percentage of the aldehydes than the amounts given above.

I claim:—

1. In the treatment of casein glue for improving the water-resistance of the glue after drying, the step of adding to the wet glue, an aldehyde which in its unpolymerized state contains a plurality of carbon atoms.

2. A casein glue of the type comprising casein, lime and alkali and water in admixture with a minor fraction of an aldehyde which in its unpolymerized state contains a plurality of carbon atoms, together with an agent selected from the herein described group consisting of aromatic sulfonic acids and their alkali metal salts, and the soluble salts of copper, nickel and calcium, which agent is capable of retarding the setting of the glue.

3. The step of adding a polymer of acetaldehyde to a fluid casein glue.

4. A mixture of casein glue comprising casein, lime, alkali and water, with an aldehyde which in its unpolymerized state contains a plurality of carbon atoms, which mixture after use as a glue and drying, has high water-resistance.

5. A glue of the type comprising casein, lime, alkali and water, to which is added a small percentage of an aldehyde which in its unpolymerized state contains a plurality of carbon atoms.

6. A casein glue of the type comprising casein, lime, alkali and water, together with a polymer of acetaldehyde.

7. In the treatment of casein glue, as defined herein, containing milk casein, hydrated lime and alkaline salts, the herein described step of adding to the glue, after the water is added, to the dry glue base, an aldehyde which in its unpolymerized state contains a plurality of carbon atoms.

8. In the treatment of casein glue, as defined herein, containing milk casein, hydrated lime and alkaline salts, the herein described step of adding to the glue, after the water is added to the dry glue base, an aldehyde which in its unpolymerized state contains a plurality of carbon atoms and a retarder.

9. In the treatment of casein glue, as defined herein, containing milk casein, hydrated lime and alkaline salts, the herein described step of adding to the glue, after the water is added to the dry glue base, a polymerized acetaldehyde.

10. In the treatment of a glue containing alkali-soluble proteids, hydrated lime and alkaline salts, the herein described step of adding to the glue, after the water is added to the dry glue base, an aldehyde which in its unpolymerized state contains a plurality of carbon atoms.

11. In the treatment of casein glue, as defined herein, containing milk casein, hydrated lime and alkaline salts, the herein described step of adding acetaldehyde to the glue, after the water is added to the dry glue base.

In testimony whereof I affix my signature.

LAWRENCE BRADSHAW.